Jan. 24, 1939.  C. M. ROAN ET AL  2,144,813
DIRECTION TURN INDICATOR FOR VEHICLES
Filed Sept. 27, 1934  4 Sheets-Sheet 1
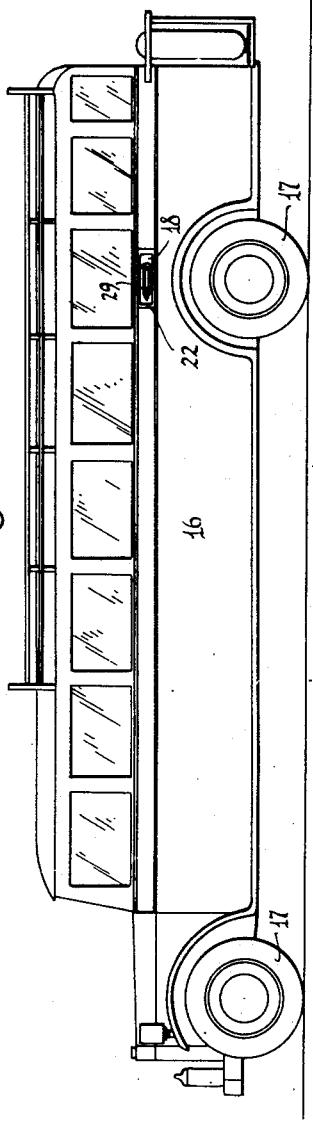
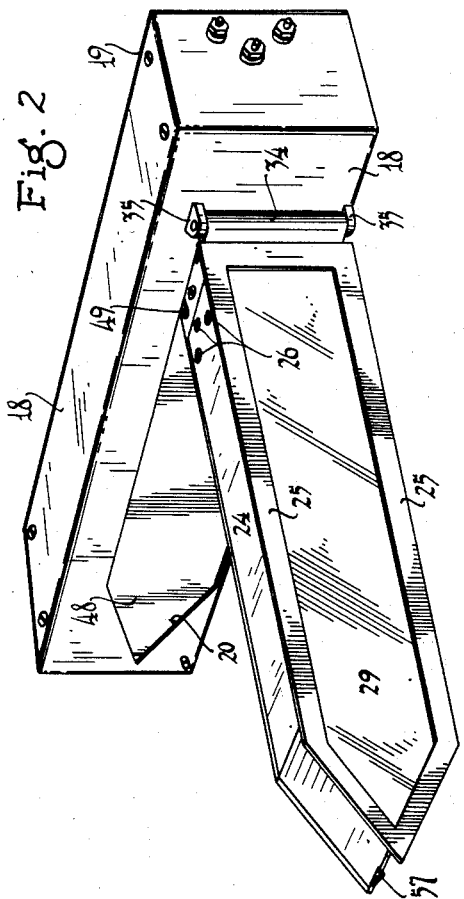
INVENTORS
Carl M. Roan
Oliver E. Kaupang
Arthur W. Rohlen
BY THEIR ATTORNEYS

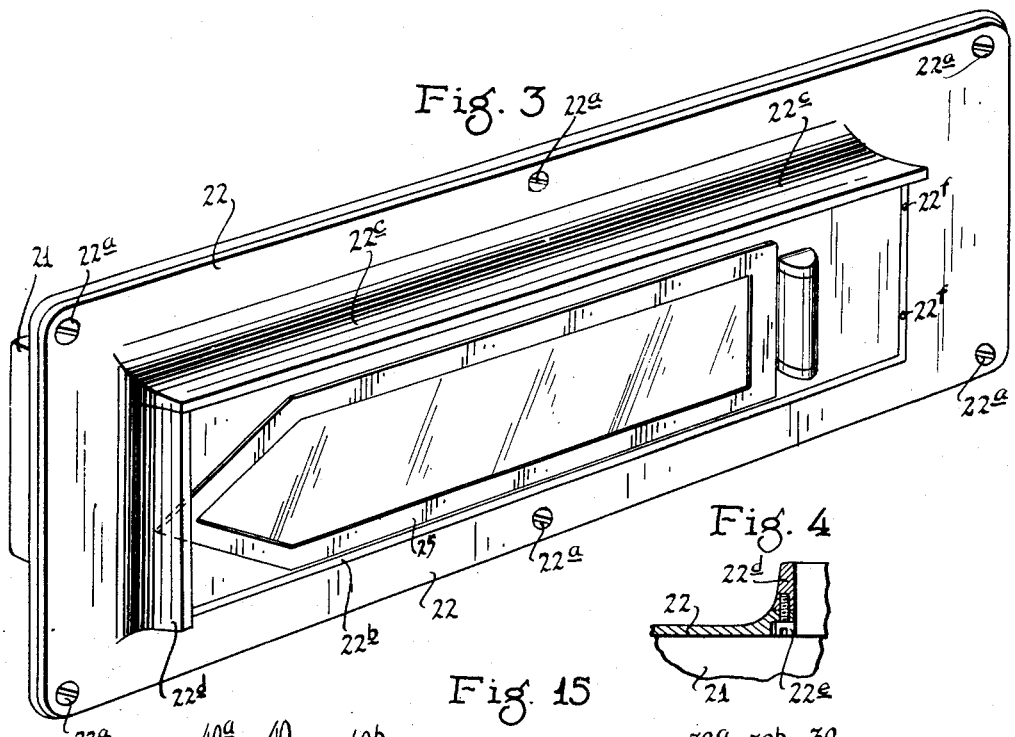
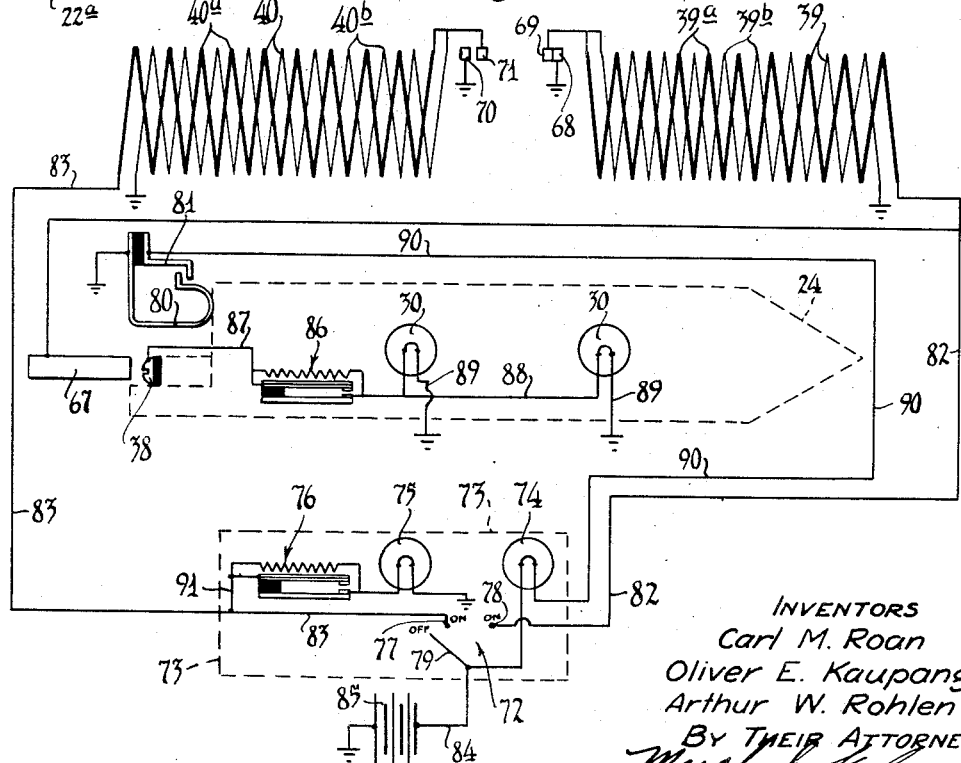

Jan. 24, 1939.   C. M. ROAN ET AL   2,144,813
DIRECTION TURN INDICATOR FOR VEHICLES
Filed Sept. 27, 1934   4 Sheets-Sheet 3
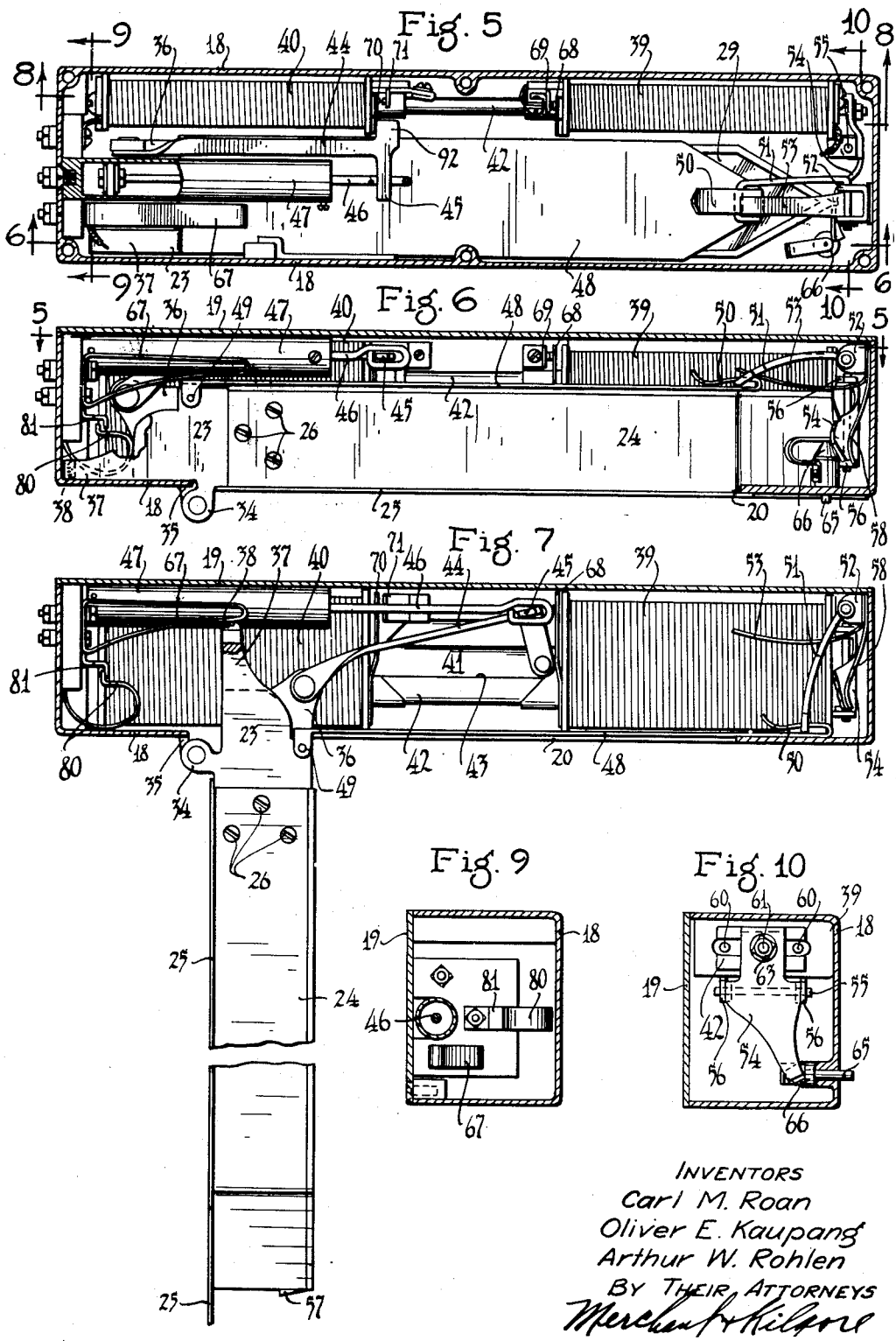
INVENTORS
Carl M. Roan
Oliver E. Kaupang
Arthur W. Rohlen
BY THEIR ATTORNEYS

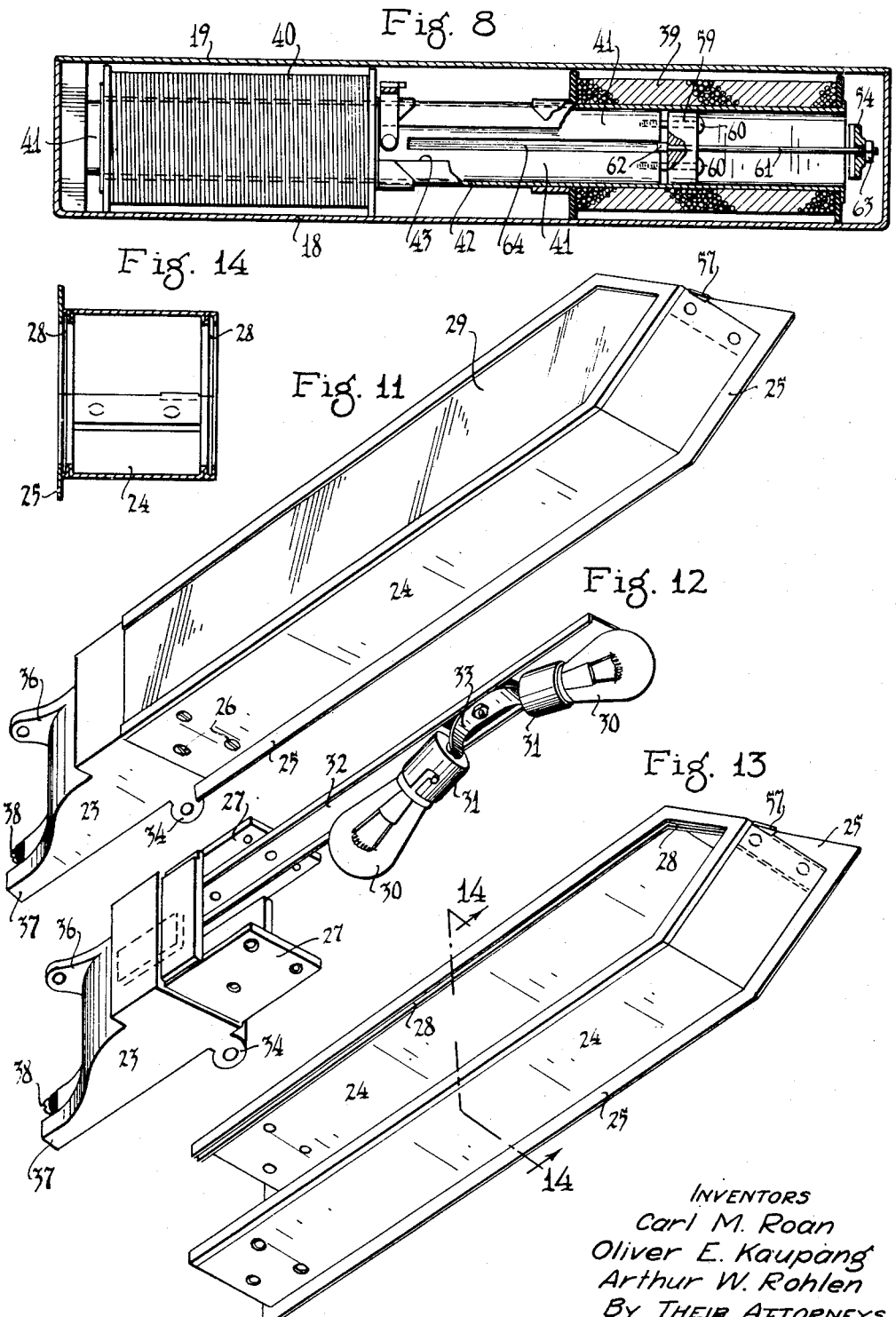

Patented Jan. 24, 1939

2,144,813

UNITED STATES PATENT OFFICE 2,144,813

DIRECTION TURN INDICATOR FOR VEHICLES

Carl M. Roan, Oliver E. Kaupang, and Arthur W. Rohlen Minneapolis, Minn., assignors to Beacon Safety Signal Co.

Application September 27, 1934, Serial No. 745,746

10 Claims. (Cl. 177—329)

Our present invention provides a highly efficient direction turn indicator for automobiles, busses, and other motor-propelled vehicles and, generally stated, consists of the novel devices, combinations of devices and arrangement of parts hereinafter described and defined in the claims.

The invention is in the nature of an improvement on or modification of the direction turn indicator disclosed and claimed in my pending application, Serial Number 612,236, filed May 19, 1932.

The present improved device involves various novel and important features as will hereinafter more fully appear, but particularly the invention involves a novel and highly efficient electro-magnetic actuating mechanism for moving to and from retracted position a signal arm which is illuminated when projected to a signalling position. This electro-magnetic actuating mechanism will usually, in practice, be energized from the storage battery which actuates the ignition system of the internal combustion engine of the vehicle; and hence as an important feature the arrangement is made whereby ample power for sure movements of the signal arm is afforded for the short instance of movement, but with a greatly reduced use of current to hold the arm while at rest in the projected position. Other important novel features will appear in the description of the operation of a commercial form of the device which is illustrated in the accompanying drawings wherein like characters indicate like parts throughout the several views.

Referring to the drawings:

Fig. 1 is a side elevation showing the direction turn indicator applied to a motor-propelled bus;

Fig. 2 is a perspective showing the indicator removed from the vehicle and from a receptacle that is preferably used in connection therewith in the application thereof to the bus;

Fig. 3 is a perspective showing the indicator applied in the receptacle therefor, the latter being removed from the bus;

Fig. 4 is a fragmentary section taken on the line 4—4 of Fig. 3;

Fig. 5 is a section taken on the line 5—5 of Fig. 6;

Fig. 6 is a section taken on the line 6—6 of Fig. 5;

Fig. 7 is a section also taken on the line 6—6 of Fig. 5 but showing the signal arm moved to a projected position, the latter being in full plan view;

Fig. 8 is a section taken on the line 8—8 of Fig. 5;

Fig. 9 is a transverse section taken on the line 9—9 of Fig. 5;

Fig. 10 is a transverse section taken on the line 10—10 of Fig. 5;

Fig. 11 is a perspective showing the signal arm and its anchoring head removed from the casing and looking at the same from its inner or rear side;

Fig. 12 is a perspective showing the anchoring head and certain parts of the arm and also some of the internal mechanism from which the shell of the arm has been removed;

Fig. 13 is a perspective showing the shell-like structure of the signal arm, to wit: that part that has been removed from Fig. 12;

Fig. 14 is a section taken on the line 14—14 of Fig. 13; and

Fig. 15 is a diagrammatic view illustrating the wiring or electric circuits of the device.

Of the parts of the bus or motor-propelled vehicle, the numeral 16 indicates the body and the numeral 17 the wheels thereof. A bus is illustrated simply for convenience as one of the kind of vehicles for which the direction turn indicator is especially adapted.

The body of the indicator is designed and especially adapted to be set into the side of the body of the vehicle. The signalling device proper comprises a box-like or rectangular casing 18 preferably of cast metal, provided on its back or inner side with a removable black plate 19 and on its front face is formed with a large long opening 20 which, as will presently appear, is made to correspond in size and form to the profile of the signal arm. As a preferred manner of installing the indicator, there is provided a box-like receptacle 21, preferably also of cast metal, which is of a size to freely receive and hold the casing 18. This receptacle will preferably be countersunk into the side of the vehicle body, as shown in Fig. 1. The receptacle is provided with a removable outer plate 22.

The signal arm is made up chiefly of two elements, to wit: the heel block 23 and a long substantially U-shaped frame 24, which latter has an outwardly projecting marginal flange 25. The sides of the frame 24 are arranged to be slid over and secured by screws 26 or the like, to flanges 27 of the heel block 23. The frame is provided with internal channels 28 that receive transparent or translucent plates 29. Preferably, the plate 29 that will be presented at the front of the vehicle when the arm is projected, will be tinted yellow, while the other plate will be tinted red. Within the arm between the transparent or translucent plates will be located one or more, as shown, two, electric light bulbs 30, shown as applied to sockets 31 secured to a bar 32 rigidly secured to one of the flanges 27 of the heel block. The electric wiring of these light bulbs will be later described in connection with certain diagrammatic views. Here it may, however, be stated that the central contacts of these bulbs which project through the sockets are engaged and grounded to the metallic parts of the vehicle by a double spring contact 33 insulated from the bar 32.

As a very efficient means for pivotally mounting the signal arm to the casing 18, the heel block 23 is shown as provided with an offset hinge lug 34 that is pivotally connected directly to hinge lugs 35 on said casing. This heel block, at points offset from the pivot 34 is provided with a lug 36, a stop arm 37 and a contact head 38 which latter is electrically insulated from the metallic heel block 23, and the function of which contact head 38 will later appear in connection with the description of the wiring system.

As a reversible motor for moving the signal arm to and from operative position, we provide axially aligned and axially and longitudinally spaced solenoids 39 and 40, both of which are securely anchored within the casing 18 and are above and out of the line of the space occupied by the arm when the latter is in closed position. As shown, these solenoids 39 and 40 are wound flat so as to take up less vertical space within the casing.

The motor employed for moving the signal arm is in the nature of a solenoid motor which includes the said coils 39 and an armature in the form of a magnetic influenced rod or core 41 that works through both of the solenoids and serves as a common armature therefor, adapted to be moved in the one direction or the other according to which of the solenoids happens to be energized. As shown, the solenoids 39 and 40 are wound on a common sleeve 42 which is of non-magnetic metal such as brass. This sleeve 42 between the solenoids has a wide slot 43 that exposes the intermediate portion of the armature 41.

The exposed intermediate portion of the armature 41 is directly connected to the lug 36 of the heel block 23, see particularly Fig. 7, by means of an L-shaped link 44. At its corner or angle, the link 44 is shown as provided with a projecting lug 45 that works in the looped head of a plunger rod 46, the head of which works in a dashpot 47 secured within the casing 18. The elements 46 and 47 just noted constitute an air-acting dashpot for cushioning the movements of the signalling arm at extreme open and closed positions.

As a feature of this invention, we provide a shutter 48 which will close the opening 20 of the casing 18 when the signal arm is projected as best shown in Figs. 2 and 7. This shutter 48 is a thin flat plate located within the casing 18 inward of the signal arm, the same being at one end pivotally connected at 29 to the heel block 23 at a point offset from its pivot. At its other or free end, the shutter 48 is formed with a back-turned finger 50 that is loosely passed through the perforated outer end of a guide arm 51, shown as pivoted to a lug 52 secured within and to the casing 18. The numeral 53 is a leaf spring shown as anchored to the lug 52 and projecting into the casing in position to engage the finger 50 of the shutter 48 when the signal arm is in closed position shown in Fig. 6. In said position shown in Fig. 6, the spring 53 is under just enough tension to hold the shutter in place when the arm is projected and to prevent rattling of the parts when the signal arm is in closed position shown in Fig. 6.

For mechanically securing the signal arm normally in a locked position, we provide a latch, preferably of a construction and arrangement shown best in Figs. 5, 6, 7 and 10. This latch 54 is intermediately pivoted at 55 to lugs 56 shown as applied to the fixed head of the adjacent solenoid 39. The free end of this latch 54 normally engages a beveled latch lug 57 on the free end of the arm frame 24, see particularly Figs. 6, 7, 11 and 13. This latch 54 is subject to a leaf spring 58 which yieldingly engages said latch with said lug 57 after the latter has cammed itself past the same and the arm has reached its retracted or closed position.

This latch is arranged to be automatically released preferably through the following actuating connections. An armature tip or supplemental section 59 is secured to that end of the armature 41 that is within the solenoid 39, with freedom for slight longitudinal sliding movements in respect to said armature, by means of headed screws 60 or the like, see particularly Fig. 8. Working through this armature tip 59 and through the inner end of the latch lever 54 is a trip rod 61 provided at its inner end with a head 62 and at its outer end with a nut or head 63. The head 62 is engageable with the armature tip 59 and is arranged to work in a long slot 64 formed in the armature 41. The manner in which these latch-actuating connections operate will appear in the description of the operation.

It may be sometimes desirable to manually release the latch from the closed signal arm so that the latter can be opened by direct hand manipulation, and hence we have shown a spring-retracted trip plunger 65 having a conical head 66 directly engageable with the free end of said latch 54. When this plunger and its head are pressed inward, the latch will be released from the arm, but it will be understood that this manual operation has nothing to do with the automatic electro-magnetic actuating mechanism.

For controlling the circuit through the lamps 30 within the signal arm, there is a switch comprising the heretofore noted contact 38 and a cooperating contact 67, see particularly Figs. 6, 7 and 15, by reference to which it will be noted that said contact 67 is in the form of a bent leaf spring, the inner surface of which is preferably curved on a circle that is eccentric to the arm pivot 35. The connections of and the circuit connections to the said switch elements 38 and 67 will appear in connection with the description of the diagram views and the operation of the device.

As an important feature, the solenoids 39 and 40 comprise heavy wire coils 39a and 40a, respectively, and fine wire coils 39b and 40b, respectively, see particularly Fig. 15. The manner in which the said heavy and light wire coils are connected is diagrammatically illustrated in Fig. 15. At the inner extremity of the coils 39a and 39b, there is a switch made up of two elements 68 and 69, and at the inner extremity of the coils 40a and 40b is a similar switch made up of contacts 70 and 71, diagrammatically shown in Fig.

15, and more fully shown in Figs. 5, 6 and 7. The switch elements 69 and 71 are elements fixed within the casing 24, while the switch elements 68 and 70 are spring switches normally tending to separate under tension of said spring elements. Switch elements 68 and 70 are grounded through the metallic casing.

For controlling the operation of the signal arm, there is provided suitable control in the nature of a switch 72 indicated only diagrammatically in Fig. 15. This switch preferably being contained in a suitable control box 73 indicated diagrammatically by dotted lines in Fig. 15 and which is preferably located within convenient reach and vision of the operator. Also located within this control box 73 is a pair of pilot light bulbs 74 and 75 and a flasher switch 76, which latter is of well known construction. The light bulbs 74 and 75 are, in practice, and may here be assumed to be visible to the operator from the exterior of the casing. The switch 72 comprises fixed contacts 77 and 78 and a movable contact arm 79, the latter in practice being provided with means for operating the same from the exterior of the casing.

For controlling the circuit to the pilot lights 74 and 75, there is a switch made up of normally separated switch contacts 80 and 81, see particularly Figs. 6, 7 and 15. These switch contacts are insulated from each other and are located within the casing 18 in the vicinity of the pivoted end of the signal arm. Contact 80 is a spring member and contact 81 is a relatively fixed member, but contact 80 is under tension to normally engage said contact 81.

The outer terminals of the fine wire coils of the solenoids 39 and 40 are shown as grounded, see Fig. 15. The outer terminal of the coil 39a of solenoid 39 is connected by a wire 82 to the switch contact 78, while the outer terminal of the coil 40a of solenoid 40 is connected by a wire 83 to the switch contact 77. Switch contact 79 is connected by wire 84 to one side of a battery 85, the opposite side of which is grounded to metallic parts of the apparatus. Preferably, this battery 85 will be the battery of the vehicle. Within the signal arm is a conventional type flasher switch 86 which, as shown, is connected to the heretofore noted switch contact 38 by a wire 87. The light bulbs 30 are connected to the flasher switch 86 and are grounded through the metallic parts of the apparatus by means of wires 88 and 89.

As before stated, switch contact 80 is grounded. The co-operating switch contact 81, by wire 90, connects the contact 81 to switch contact 79 through the pilot light 74. A wire or lead 91 taps the wire or lead 83 and leads to the ground or metallic casing through the flasher switch 76 and the pilot light 75.

It will be noted that the link 44 in addition to the projecting lug 45 has a projecting lug 92, see Fig. 5, which is arranged to alternately engage with the spring contacts 68 and 70 of the two solenoid controlling switches.

The outer plate 22 of the receptacle 21 is removably applied to the said receptacle 21 by means of screws or the like 22a, and is provided at the upper edges of its signal arm opening 22b with outwardly projecting flanges 22c and 22d. The flange 22c is cast as an integral part of the plate 22, but the flange 22d will preferably and is, as illustrated, detachably applied thereto by suitable screws 22e or the like, but adapted to be received in screw holes 22f provided in the plate 22 at either end of the opening 22b, so as to permit the flange 22d to be applied at either end of the opening 22b, depending upon which side of the vehicle the signal is applied to, and hence which end of the device faces forward.

Operation

Figs. 5 and 6 show the parts of the indicator in normal condition with the arm retracted, and Fig. 15 diagrammatically illustrates the dormant condition of the apparatus with the parts in the positions just stated. It will first be assumed that switch arm 79 has been moved into engagement with the contact 78 of switch 72. This setting of the switch will close the circuit from battery 85, through wire 84, through wires 82, through the heavy winding 39a of right-hand solenoid 39, and thence through switch contact 68—69 to ground and back to battery. This will energize the solenoids 39 with maximum power and the energized solenoid acting on the armature bar 41 will move the latter toward the right, thereby through the link 44 imparting an opening movement to the signal arm. The initial effect of the action of the solenoid 39 is to magnetize the armature bar 41, causing the latter, see Fig. 8, to impart a slight movement toward the left to the armature tip 59, which, acting through the rod 61, will move the latch lever 54 out of engagement with the detent 57 of the indicator arm, thereby releasing the latter so that it may be freely swung into its projected position by subsequent and immediately following movement of said armature bar 41 toward the right in respect to Figs. 5, 7 and 8.

Here attention is called to the fact that simultaneous with the movement of the indicator arm to projected or operative position, the shutter 48 will be moved outward to a position to completely close the opening 20 as clearly shown in Fig. 7. As the armature bar 41 reaches its extreme position toward the right and the signal arm reaches its extreme projected position, the lug 92 on the link 44 engages the yielding contact 68, see Figs. 5 and 15, and moves said contact out of engagement with the co-operating contact 69, thereby opening said switch. This opening of said switch does not actually break the circuit through the coils of the solenoid 39, but when said switch is open, the current from the battery 85 will then flow from wire 82 first through the heavy winding 39, thence back through the fine or high resistance wire 39b, from thence through ground back to the battery 85. When the two wires 39a and 39b are thus connected in series, the resistance of the fine wire will very greatly cut down the flow of current but will hold the solenoid magnetized under enough force to prevent accidental movements thereof from its projected position.

In this way, relatively large power is afforded to actually move the arm, and battery current is saved by throwing in the high resistance to maintain the arm in its projected position. For example, in practice twenty-five amperes may be consumed by the main winding 39a for producing movements of the signal arm, and only about five amperes will be consumed to hold the arm projected.

Attention is here called to the fact that when the armature bar is moved from the left toward the right as above described, contact 70 will automatically engage contact 71 of left-hand switch made up of said contacts 70 and 71. This engagement of the said contacts 70 and 71, however, does not in itself close the circuit through either of the coils of the left-hand solenoid 40.

The following further things take place during the operation of moving the indicator arm to its projected position, to wit: as the arm approaches its projected position, the contact 38 will be engaged with the contact 67 with a wiping action, and thereby closing the circuit from the battery 85 through wire 84, switch contact 79, wire 82, wire 82a, said contacts 67–38, wire 87, flasher switch 86, wire 88, light bulbs 30 (which bulbs are within the arm), and from said bulbs through wires 89 and ground back to battery 85. By this connection, the light bulbs 30 within the projected signal arm will be illuminated and the illumination will be made intermittent or flashing by the flasher switch 86.

The projected condition of the indicator arm is indicated to the operator of the vehicle by illumination of the pilot light 74, the circuit of which is controlled by a switch comprised of contacts 80 and 81, and which switch closes automatically when the signal arm is moved from a retracted position.

When the signal arm is to be returned from its projected to its normal or closed position within the casing, switch 79 will be moved to the left into engagement with contact 77, thereby de-energizing both coils of the solenoid 39 and energizing the heavy or main winding 40a of the solenoid 40. When this solenoid 40 is energized, it will, of course, draw the armature bar 41 from the right back to its extreme left-hand position, the initial movement thereof permitting re-engagement of the contacts 68 and 69 preparatory for the next operation of the solenoid 39.

As soon as the switch arm 79 is engaged with contact 77, the circuit will be closed from battery 85 through wires 84, 83, 91, flasher 76 and pilot bulb 75 to ground and back to battery. The pilot light 75 serves as an indicator and check, indicating to the operator that the retracting solenoid 40 is energized and that battery current is being consumed. Under movement of the indicator arm from its projected back to its retracted or normal position, contact 38 will be moved out of engagement with the contact 67, thereby breaking the circuit through the light bulbs 30 that are within the signal arm. As the signal arm reaches the limit of its inward or closing movement, two other things take place, to wit:

(a) The heel block 23 engages the switch contact 80, thereby opening the switch 80—81, and thereby breaking the circuit through the pilot bulb 74; and (b) The lug 92 of link 44 engages the movable switch contact 70 and disengages the same from contact 71, thereby throwing the windings 40a and 40b in series, so that the signal arm will be held closed with a relatively small current consumption as long as the switch 79 is left in engagement with contact 77.

At its first opportunity, after moving switch contact 79 into engagement with co-operating contact 77 to thereby retract the signal arm, the operator will move the switch arm 79 to its inoperative position shown in Fig. 15, thereby interrupting all electric circuits of the system. This interrupting of the windings of the solenoid 40 releases the armature tip 59 and permits the latch 54 to engage its co-operating detent 57 and positively locks the signal arm against accidental movements. The shutter 48 tightly closes the casing 18 and protects the operating mechanism from the elements during the time the signal arm is extended, and of course, moves back within the casing and assumes its inoperative position as shown in Figs. 5 and 6 when the signal arm is retracted.

The switch 72, it should be noted, is so arranged that in order to place the switch arm 79 in engagement with its co-operating contact 78 in order to extend or project the signal arm, it is necessary to pass over and at least momentarily engage the contact 77. This passing over and momentarily engaging the contact 77 with the switch arm 79 momentarily energizes the retracting solenoid 40 and produces an inward pulling, jarring action on the signal arm, which, in case of sleet collecting on the outer face of the signal arm and adjoining portions of the casing 18 would tend to break such sleet loose so that when the solenoid 39 was energized, the signal arm would be free to move outward.

What is claimed is:

1. In a device of the kind described, a movable signal arm, motor means for the signal arm, said motor means being made up of axially spaced solenoid coils and an armature common to both of said solenoid coils and adapted to be moved in one direction upon energization of one of said coils and in an opposite direction upon energization of the other of said coils, operating connections between the motor means armature and signal arm, one of said solenoid coils being made up of two windings, a source of potential, independent circuits for opposite solenoid coils, a manually operated control switch associated with said circuits for selectively completing either thereof, and automatic switch means so associated with the circuit of the two-winding solenoid that only one winding of said two-winding solenoid coil will be energized for performing projecting and retracting movements of the armature and signal arm thereby and so that both windings thereof will be connected in series at the completion of projecting movements of the armature and arm thereby.

2. In a device of the kind described, a movable signal arm, motor means for the signal arm, said motor means being made up of axially spaced solenoid coils and an armature common to both of said solenoid coils and adapted to be moved in one direction upon energization of one of said coils and in an opposite direction upon energization of the other of said coils, operating connections between the motor means armature and signal arm, at least one of said solenoid coils being made up of fine and relatively coarse windings, a source of potential, independent circuits for opposite solenoid coils, a manual control switch associated with said circuits for selectively completing either thereof, and automatic switch means so associated with the circuit of the multiple winding solenoid that only the coarse winding thereof will be energized for performing projecting and retracting movements of the armature and signal arm thereby and so that the coarse and co-operating fine windings thereof will be connected in series at the completion of projecting movements of the armature and signal arm thereby.

3. In a device of the kind described, a movable signal arm, motor means for the signal arm, said motor means being made up of axially spaced solenoid coils and an armature common to both of said solenoid coils and adapted to be moved in one direction upon energization of one of said coils and in an opposite direction upon energization of the other of said coils, operating connections between the motor means armature and signal arm, said solenoid coils each comprising relatively fine and relatively coarse windings, a source of potential, independent circuits for opposite solenoid coils, a manual control switch associated with said circuits for selectively completing either thereof, and automatic switch means so associated with the said circuits that only the coarse winding of either of the solenoid coils will be energized for performing projecting and retracting movements of the armature and signal arm thereby and so that the coarse and fine windings thereof will be connected in series at the completion of the projecting movements.

4. The structure defined in claim 1 in which the said automatic switch means comprises a switch and a co-operating element moved by the motor armature and operatively engageable with the automatic switch to actuate the same at the completion of a movement of the signal arm and armature resulting from energization of the two-winding solenoid coil.

5. The structure defined in claim 3 in which the said automatic switch means comprises a pair of switches, one interposed in each of said solenoid circuits and means moved by the motor armature and operatively engaging one of said switches when the signal arm is retracted and the other of said switches when the signal arm is projected.

6. In a device of the class described, the combination with a casing having a large opening, in one side a signal arm pivoted at one end portion to the casing adjacent one end of the opening therein for movements into and out of the casing through said opening, and means for operating the signal arm, of a shutter within the casing behind the signal arm, and means for automatically moving the shutter to a position to close the casing opening when the signal arm is extended from the casing and for automatically retracting the shutter into the casing behind the signal arm when the signal arm is retracted.

7. The structure defined in claim 6 in which the said shutter operating means includes means for pivotally connecting one end of the shutter to the pivoted end portion of the signal arm at a point offset from the axis of the signal arm, and an arm pivoted within the casing and having its free end pivotally connected to the other end of said shutter to assist in moving the shutter to and from casing closing position.

8. The structure defined in claim 6 in which the shutter operated means includes means for pivotally connecting one end of the shutter to the pivoted end portion of the signal arm at a point offset from the axis of the signal arm, and means for positively guiding the other end of the shutter under movements imparted to the shutter by the signal arm.

9. In a device of the kind described, a casing having an opening in one side, a signal arm pivotally connected at one end portion to the casing adjacent one end of the opening therein for movements into and out of the casing through said open side, reversible electro-magnetic motor means for projecting and retracting the signal arm, said reversible motor means comprising axially spaced solenoid coils and an armature common to said coils and movable in one direction as a result of energization of one of the coils and in the opposite direction as a result of energization of the other of said coils, circuits for the solenoid coils including a control switch for selectively completing either thereof, and an operating connection between said armature and pivoted signal arm comprising a link pivoted at one end to the armature at a point between the solenoid coil and at its other end to the signal arm at a point offset from the axis of the pivot of the signal arm.

10. The combination with a vehicle body, of a signal device of the kind described comprising a signal arm pivoted to one side portion of the body for movements between a position wherein the signal arm is parallel with the side of the body to a position wherein the signal arm is projected at substantially right angles to the body, reversible electric motor means for moving said signal arm to and from projected position, reversing circuits for said motor, and control mechanism for said reversing circuits including a master switch having two fixed and one movable contact, one of said fixed contacts and the said movable switch contact being connected in and controlling one of the reversing circuits and the other of said fixed contacts and said movable contact being connected in and controlling the other of said reversing circuits, the said movable contact being arranged to require movement from normal position over the fixed contact that controls closing movements of the signal arm before it reaches the fixed contact controlling projecting movements of the signal arm, whereby to produce a momentary energization and consequent jarring of the signal arm just prior to energization of the solenoid tending to extend the signal arm, said jarring tending to free the signal arm in case it becomes stuck.

CARL M. ROAN.
OLIVER E. KAUPANG.
ARTHUR W. ROHLEN.